United States Patent [19]

Yoshitoshi et al.

[11] Patent Number: 4,897,828
[45] Date of Patent: Jan. 30, 1990

[54] OPTICAL PICKUP DEVICE

[75] Inventors: You Yoshitoshi, Ashiya; Hidehiro Kume, Tokyo; Yoshiyuki Matsumoto, Tokyo; Koji Mitsumori, Tokyo; Etsufumi Yamamoto, Kanagawa; Hiroshi Oinoue, Tokyo, all of Japan

[73] Assignee: Sony Corporation, Tokyo, Japan

[21] Appl. No.: 219,916

[22] Filed: Jul. 15, 1988

[30] Foreign Application Priority Data

Jul. 31, 1987 [JP] Japan .................. 62-191640

[51] Int. Cl.$^4$ .............................. G11B 7/09
[52] U.S. Cl. .................... 369/46; 250/201; 350/96.11
[58] Field of Search ................. 369/44–46; 250/201 DF, 216; 350/96.11

[56] References Cited

U.S. PATENT DOCUMENTS

| | | | |
|---|---|---|---|
| 4,011,400 | 3/1977 | Simons et al. | 369/46 X |
| 4,654,519 | 3/1987 | Ando | 250/216 |
| 4,725,725 | 2/1988 | Ando | 250/216 |
| 4,823,331 | 4/1989 | Yoshitoshi et al. | 350/96.11 X |

FOREIGN PATENT DOCUMENTS 62-197931 9/1987 Japan .

*Primary Examiner*—Aristotelis M. Psitos
*Attorney, Agent, or Firm*—Philip M. Shaw, Jr.

[57] ABSTRACT

A focusing error detecting apparatus having a first photo-detector of which the light receiving portion is halved to provide first and second light receiving portions asymmetrical with respect to the center of a beam spot of a bundle of incident laser beams, the first photo-detector being located in the optical path ahead of the focusing point of the bundle of the incident laser beams, a second photo-detector of which the light receiving portion is halved to provide first and second light receiving portions asymmetrical with respect to the center of a beam spot of a bundle of incident laser beams, the second photo-detector being located in the optical path behind a focussing point of the bundle of the incident laser beams and a calculating circuit for calculating a difference between a difference of detected outputs from the first and second light receiving portions of the first photo-detector and a difference of detected outputs from the first and second light receiving portions of the second photo-detector, thereby to derive a focusing error signal from the output of the calculating circuit.

14 Claims, 6 Drawing Sheets

OPTICAL PICKUP DEVICE

BACKGROUND OF THE INVENTION

1. Field of the Invention

The present invention relates generally to optical pickup devices and more particularly to a focusing error detecting apparatus for use with such an optical pickup device.

2. Description of the Prior Art

Figure 1A:
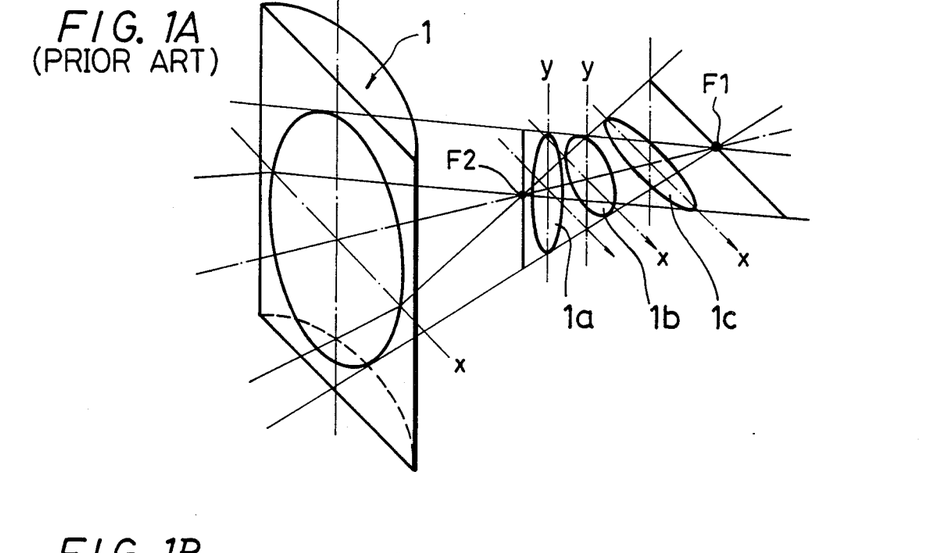
FIGS. 1A to 1C are respectively schematic representations of an optical system, beam patterns on light receiving portions and focusing error detecting signals used in a conventional focusing error detecting method according to the astigmatism system.
Figure 1B:
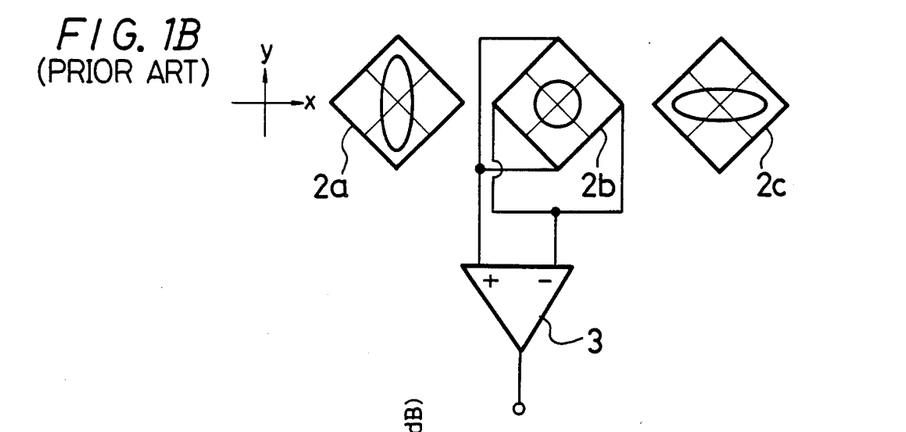
Figure 1C:
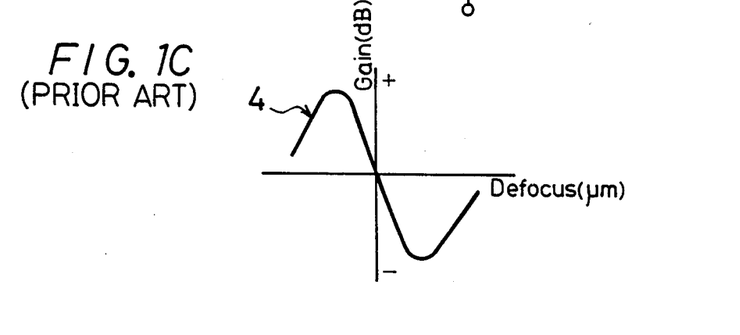

An optical pickup device or head is known to reproduce a signal from information recording pits on an optical recording medium such as an optical disc and so on. In this optical pickup head, a focusing servo is effected in order to accurately focus a beam spot of a laser beam emitted from the optical pickup head to the recording surface of an optical disc. To effect the above-mentioned focusing servo, a focusing error signal has to be detected. Various detecting systems have been proposed so far to detect the focusing error signal. FIGS. 1A to 1C respectively illustrate an optical system, a beam pattern on a light receiving element and a detecting signal utilized in a focusing error detecting system according to the so-called astigmatism system. This astigmatism system is widely used as one of the focusing error detecting systems and the details thereof are disclosed, for example, in U.S. Pat. No. 4,023,033. According to this astigmatism method, a laser beam emitted from a laser light source such as a semiconductor laser chip is irradiated on a recording surface of an optical disc such as an optical recording medium. The reflected laser beam from the optical disc is introduced into a beam splitter thereby to refract the optical path of this laser beam. Thereafter, the laser beam is traveled through a cylindrical lens 1 to be focused on a light receiving element such as a PIN diode of which the light receiving face is equally divided to provide four divided light-receiving portions in an astigmatism manner. As shown in FIG. 1A, such a beam spot as described above forms a circular beam spot 1b at the just focusing position, while such a beam spot forms an elliptic beam spot 1a which is long in the y axis direction at the position ahead of the focusing position; and it forms an elliptic beam spot 1c which is long in the x axis direction at the position behind the focusing position. Thus, if sum signals from the respective light receiving portions opposing to one another in the y- and x-axis directions in the four receiving portions are supplied to a calculating circuit 3 such as a differential amplifier as shown in FIG. 1B, in which a difference therebetween is calculated. When the beam spot diameter thereof lies at the just focusing 2b as shown in FIG. 1B, the focusing error signal from the calculating circuit 3 become zero. When the beam spot diameter is located at the point 2a ahead of the just focus 2b, a positive error signal is produced from the calculating circuit 3. When the beam spot diameter is located at the position 2c behind the just focus 2b, a negative error signal is produced from the calculating circuit 3. Thus, a focusing error signal having an S-shaped curve characteristic shown in FIG. 1C is produced from the calculating circuit 3. This conventional astigmatism method requires a cylindrical lens to focus a beam spot in an astigmatism manner. Further, an optical system must be aligned with high accuracy to precisely focus a reflected-back light from the optical disc at the center of the four light receiving faces.

Figure 2:
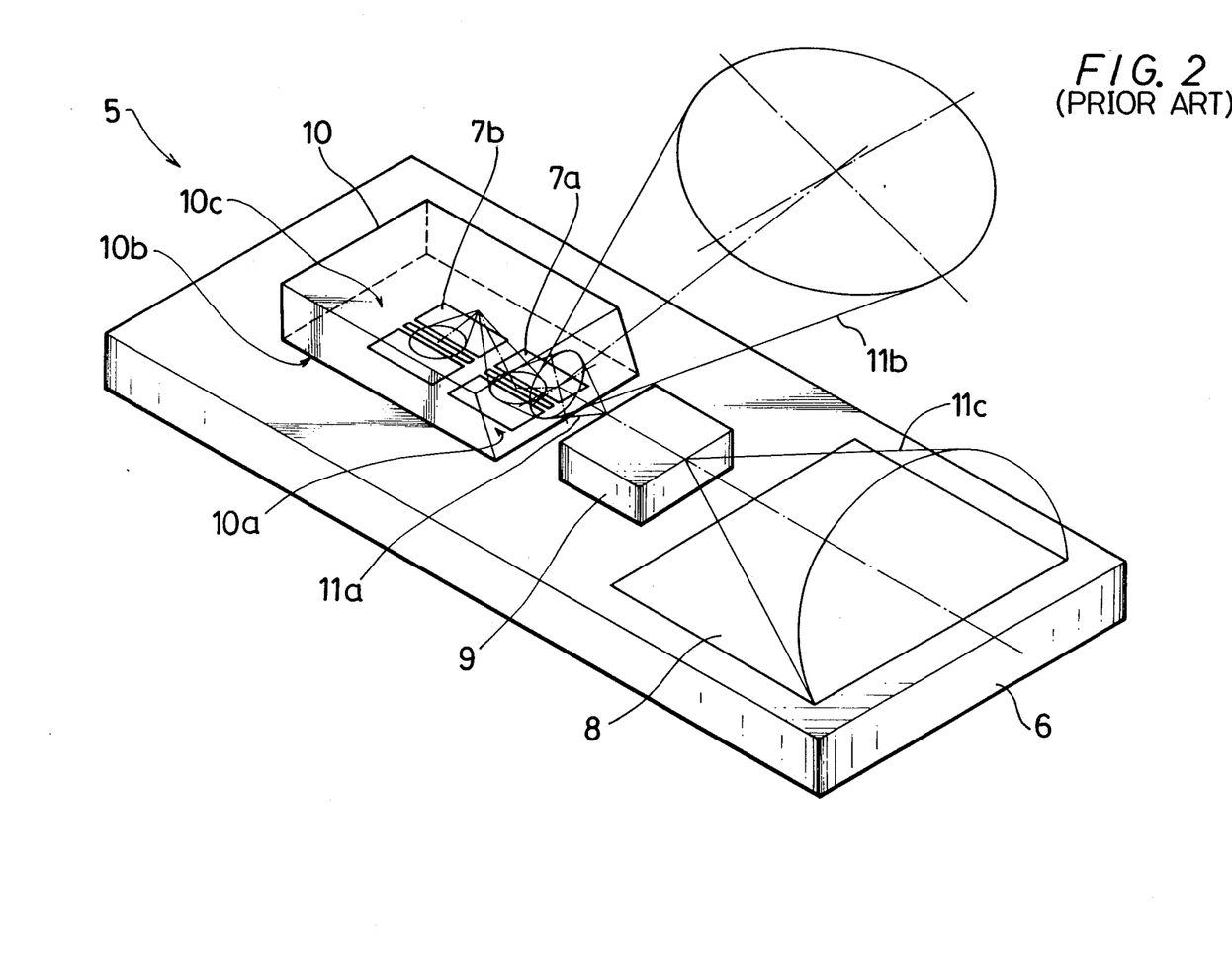
FIG. 2 is a perspective view of another example of a conventional optical head device.

To remove the above-mentioned defects, the same assignee of the present application has previously proposed a focusing error signal detecting apparatus in which the light receiving element is divided to provide three light receiving portions as is disclosed in Japanese Laid-Open Patent Gazette No. 62-197931. FIG. 2 illustrates an arrangement of such a focusing error signal detecting apparatus.

Referring to FIG. 2 forming a perspective view, there is provided an optical pickup device or head 5 in which first and second light receiving elements 7a and 7b such as PIN diodes for detecting a focusing error signal are provided on a major surface of a rectangular semiconductor substrate 6 made of silicon or the like at the position of the left-hand side half of the major surface in the drawing. The first and second light receiving elements 7a and 7b make two pairs of light receiving portions, each of which is divided to provide three portions to detect a laser beam. Further, a third monitoring light receiving element 8 formed of a PIN diode or the like is located at the right-hand half of the major surface of the semiconductor substrate 6. Between the first and third light receiving elements 7a and 8, a light emitting element 9 such as a semiconductor laser chip or the like is soldered directly to the semiconductor substrate 6 and a prism 10 of trapezoidal-shape in cross section is secured on the first and second light receiving elements 7a and 7b. Also, of a face 10b of the prism 10 contacting with the semiconductor substrate 6, other faces than the faces contacting with the first and second light receiving elements 7a and 7b and a face 10c of the prism 10 opposing the face 10b are all formed as the reflection faces.

With the above-mentioned arrangement, a laser beam 11a emitted from the active layer of the light emitting element 9 is reflected on a semi-transparent reflection face 10a of the prism 10 and is then irradiated, though not shown, through an objective lens on the optical disc as an incident beam 11b. A reflected beam of the incident beam 11b on the optical disc is traveled through the face 10a of the prism 10 and is made incident on the first light receiving element 7a of the first pair. The traveling light is reflected on the semi-transparent layer (not shown) provided on the first light receiving element 7a and between the prism 10 and the semiconductor substrate 6 and then reflected on the face 10c of the prism 10 to become incident on the second light receiving element 7b of the second pair, thereby to detect data and focusing error signal corresponding to the information pits on the optical disc. Reference numeral 11c designates a monitor laser beam emitted from the opposite active layer of the light emitting element 9.

Figure 3:
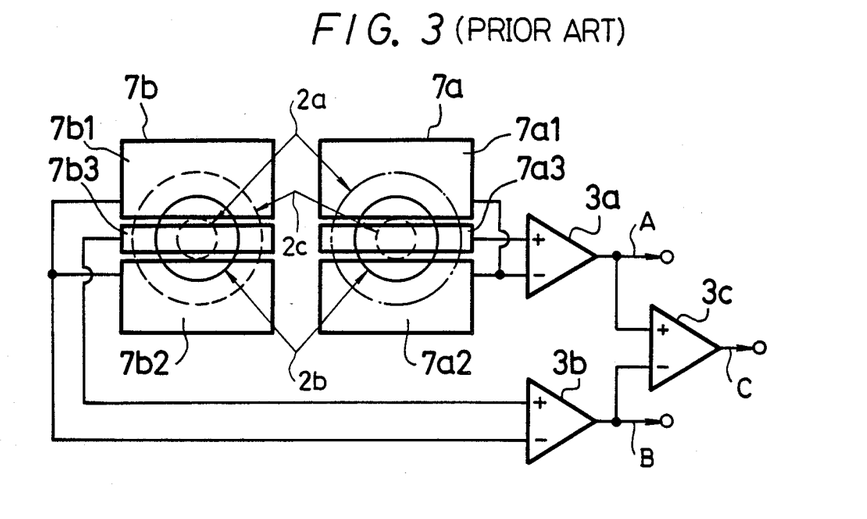
FIG. 3 is a plan view of the light receiving element shown in FIG. 2 and also illustrating a circuit arrangement of a focusing error detecting circuit.

FIG. 3 illustrates a plan view of the above-mentioned first and second light receiving elements 7a and 7b and a focusing error detecting circuit. The first and second light receiving elements 7a and 7b are respectively formed of three-divided light receiving faces 7a1, 7a2, 7a3; and 7b1, 7b2, 7b3. Of the thus three-divided light receiving portions, the central light receiving portions 7a3 and 7b3 are made narrow in width and the beam spots are respectively irradiated at the central positions of these light receiving portions 7a3 and 7b3. Detected signals derived from the right and left light receiving portions 7a1 and 7a2 of the first light receiving element 7a are supplied to an inverting input terminal of a first differential amplifier 3a and a detected signal derived from the central light receiving portion 7a3 is supplied to a non-inverting input terminal of the first differential amplifier 3a, thereby to derive a differential output A shown by a one-dot chain line in FIG. 4. In the second light receiving element 7b, detected outputs from the right and left light receiving portions 7b1 and 7b2 are supplied to an inverting input terminal of a second differential amplifier 3b and a detected output from the central light receiving element 7b3 is supplied to a non-inverting terminal of the second differential amplifier 3b, thereby to derive a differential output B shown by a broken line in FIG. 4. If the outputs A and B from the first and second differential amplifiers 3a and 3b are respectively supplied to a third differential amplifier, i.e., calculating circuit 3c at its non-inverting and inverting input terminals and a difference between the outputs A and B is thereby calculated, the third differential amplifier 3c produces a focusing error signal C shown by a solid line in FIG. 4. In FIG. 3, a solid line, a one-dot chain line and a dashed line on the first and second light receiving elements 7a and 7b illustrate the following conditions that the beam spot diameter of the laser beam incident on the optical disc is located at the just focus position 2b; it is located at the position 2a ahead of the just focus position 2b; and it is located at the position 2c behind the just focus position 2b, respectively.

With the above-mentioned optical pickup head structure, it is not necessary to provide a cylindrical lens which changes, when the focusing error signal is detected, the shape of the beam spot.

Figure 4:
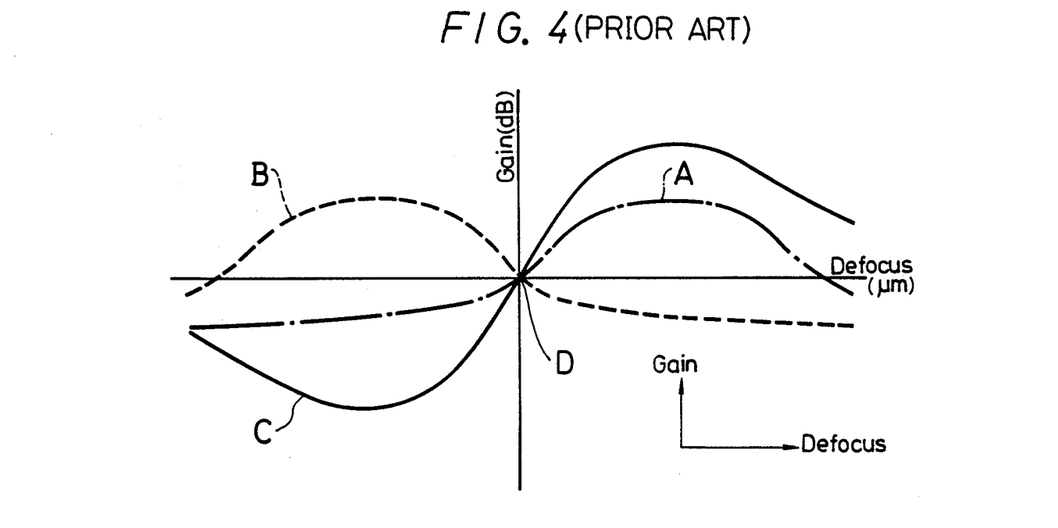
FIG. 4 is a graph graphing focusing error detecting characteristics of the prior art shown in FIG. 3.

According to the focusing error detecting circuit shown in FIG. 3, unless the light emitting element 9 and the prism 10 are mounted on the semiconductor substrate 6 with excellent alignment accuracy in such a fashion that the reflected-back light from the optical disc irradiates the central portions of the central light receiving elements 7a3 and 7b3 of the first and second light receiving elements 7a and 7b, the focusing error detecting signal curve C (S-shaped curve) of FIG. 4 does not form an S-shaped curve which is symmetrical with respect to the just focus position D but it presents an asymmetrical property. Alternatively, the above-mentioned S-shaped curve C forms two or more of so-called zero-cross points with the result that the stable focusing servo cannot be effected.

OBJECTS AND SUMMARY OF THE INVENTION

Accordingly, it is an object of the present invention to provide an improved focusing error detecting apparatus which can remove the above-mentioned shortcomings inherent in the prior art.

It is another object of the present invention to provide a focusing error detecting apparatus which can execute stable focusing servo operation.

It is a further object of the present invention to provide an improved optical pickup device which can obviate the defects encountered with the prior art.

It is a yet further object of the present invention to provide an optical pickup device in which alignment accuracy of an optical system can be alleviated considerably and no zero-cross point is produced except the just-focused point.

According to an aspect of the present invention, there is provided a focusing error detecting apparatus for detecting a focusing error signal by which an objective lens for always converging a laser beam emitted from a laser light source on a signal recording surface of an optical disc in accordance with the movement of said optical disc is moved in the direction parallel to an optical axis of said emitted laser beam incident on said optical disc, said focusing error detecting apparatus comprising:

(a) a first photo-detector located in the optical path ahead of a focus point of a reflected-back light from said optical disc through said objective lens and having divided first and second light receiving portions of different sizes which are asymmetrical with respect to the center of beam spot of said reflected-back light incident on said first and second light receiving portions;

(b) a second photo-detector located in the optical path behind the focus point of the reflected-back light from said optical disc through said objective lens and having divided first and second light receiving portions of different sizes which are asymmetrical with respect to the center of beam spot of said reflected-back light incident on said first and second light receiving portions of said second photo-detector; and (c) calculating means for calculating a difference between detected outputs from said first and second photo-detectors to produce a focusing error signal.

According to another aspect of the present invention, there is provided an optical head device comprising:

(a) a semiconductor laser chip mounted on a substrate;

(b) converging means for converging a laser beam emitted from said semiconductor laser chip on a certain point of an optical path of said emitted laser beam;

(c) a first photo-detector located in the optical path ahead of a focusing point of an incident laser beam through said converging means mounted on said substrate and having divided first and second light receiving portions which are different in size and asymmetrical with respect to the center of beam spot of said incident laser beam;

(d) a second photo-detector located in the optical path behind the focusing point of the incident laser beam through said converging means mounted on said substrate and having divided first and second light receiving portions which are different in size and asymmetrical with respect to the center of beam spot of said incident light;

(e) an optical element mounted on said first and second photo-detectors located on said substrate and of which the face opposing to said semiconductor laser chip is formed as an inclined face for reflecting said laser beam emitted from said semiconductor laser chip and has a semi-transparent layer through which said laser beam incident thereon through said converging means travels; and (f) calculating means for calculating a difference between respective detected outputs from said first and second photo-detectors to produce a focusing error signal, whereby said focusing error signal from said calculating means is fed back to said converging means.

The above, and other objects, features and advantages of the present invention will become apparent from the following detailed description of the preferred embodiments, to be taken in conjunction with the accompanying drawings, throughout which like reference numerals designate like elements and parts.

DETAILED DESCRIPTION OF THE PREFERRED EMBODIMENTS

Now, an embodiment of an optical pickup device, particularly the focusing error detecting apparatus according to the present invention will hereinafter be described in detail with reference to FIGS. 5 to 10.

Figure 5:
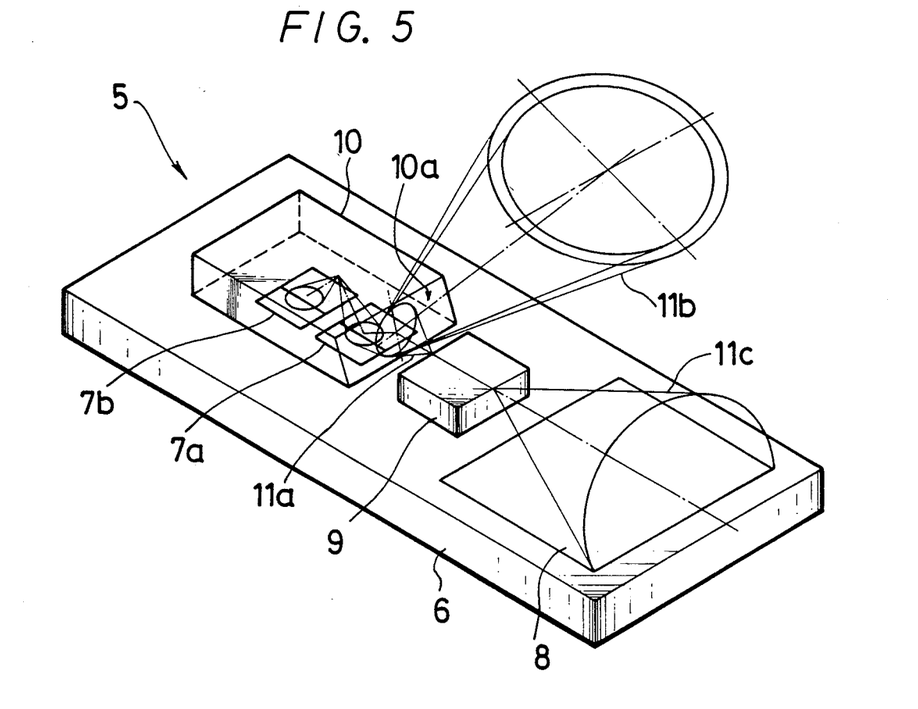
FIG. 5 is a perspective view of an embodiment of an optical pickup device according to the present invention.

FIG. 5 is a perspective view illustrating an optical pickup device having incorporated therein a focusing error detecting apparatus of the present invention. In FIG. 5, like parts corresponding to those of FIG. 2 are marked with the same references and therefore need not be described in detail.

Figure 7:
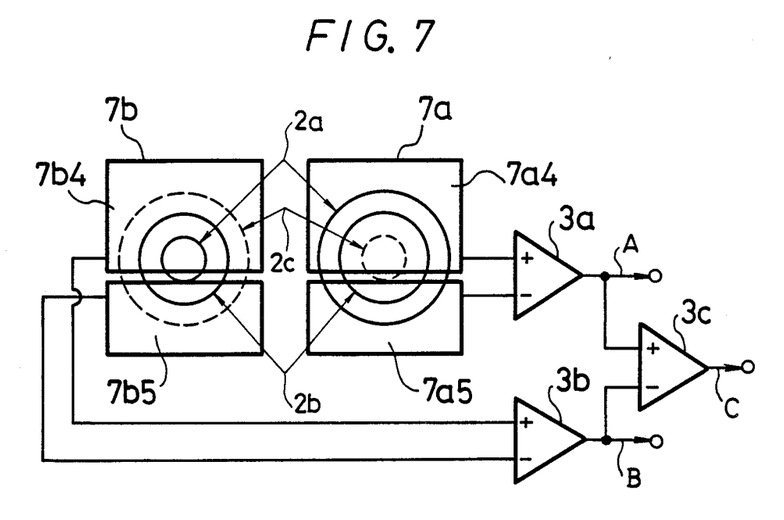
FIGS. 7 and 11 are respectively plan views of an embodiment of light receiving elements and circuit arrangements of focusing error detecting circuits according to the present invention.

Referring to FIG. 5, the reflected-back light from the optical disc is irradiated on the first and second light receiving elements $7a$ and $7b$ formed on the semiconductor substrate 6 as illustrated in a plan view forming FIG. 7. These first and second light receiving elements $7a$ and $7b$ have their light receiving faces halved at the positions displaced from the center of the beam spot of the reflected-back light by predetermined displaced amounts, or the light receiving elements $7a$ and $7b$ are respectively provided with two or first and second light receiving portions $7a4$, $7a5$ and $7b4$, $7b5$. Specifically, the first light receiving portions $7a4$ and $7b4$ of the first and the second light receiving elements $7a$ and $7b$ are formed wider than the second light receiving portions $7a5$ and $7b5$ thereof. Detected signals, each having intensity corresponding to the light amount of beam spot derived from the first and second light receiving portions $7a4$, $7a5$ and $7b4$, $7b5$ of the respective first and second light receiving elements $7a$, $7b$ are respectively supplied to non-inverting and inverting input terminals of the first and second differential amplifiers $3a$ and $3b$ which respectively produce at their output terminals outputs A and B shown in the graph forming FIG. 8 of focusing error signal detecting characteristic curves. The outputs A and B are supplied to the non-inverting and inverting input terminals of the third differential amplifier, i.e., calculating circuit $3c$, in which they are subtracted from each other to produce a differential output shown by the curve C in FIG. 8. This differential output C presents a characteristic curve having excellent linearity and having no zero-cross point except the just focus position D.

Figure 6:
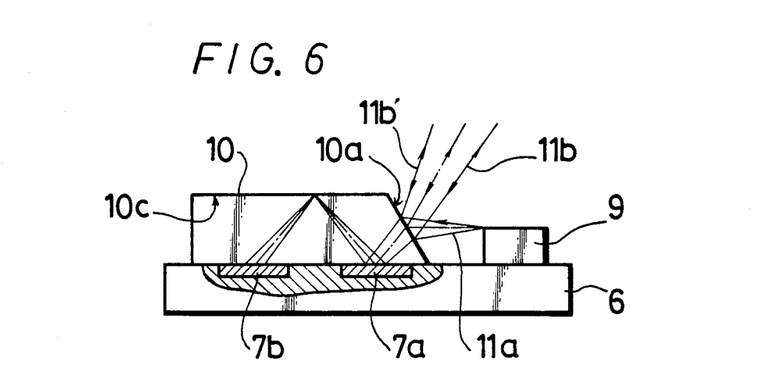
FIG. 6 is a fragmentary cross-sectional side view used to explain an optical path of the present invention.
Figure 8:
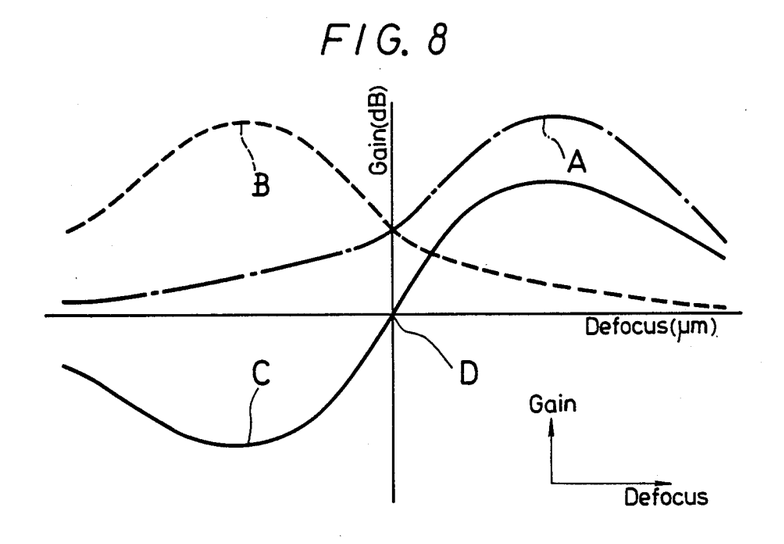
FIG. 8 is a graph graphing characteristics of a differential output between the first and second light receiving elements of the present invention.

A relationship between a spot diameter of the laser beam irradiated on the first and second light receiving elements $7a$, $7b$ and the optical path thereof will be described with reference to FIGS. 6 and 7. FIG. 6 is a side view of the optical pickup head shown in FIG. 5 and looking the light receiving element portion of the optical pickup head in cross section. As FIG. 6 shows, the laser beam $11a$ emitted from the light emitting element 9 is reflected on the semi-transparent reflection face $10a$ of the prism 10 to become an incident laser beam $11b$. In this case, such a focusing servo is effected that this incident laser beam $11b$ is focused at an information pit position of a recording medium formed on the optical disc (not shown). A reflected-back laser beam $11b'$ from the optical disc (more precisely, the recording medium formed on the optical disc) becomes incident on the semi-transparent reflection face $10a$ of the prism 10. The reflected-back laser beam $11b'$ travels through the semi-transparent reflection face $10a$ and is made incident on the first light receiving element $7a$ under a focusing condition before it is converged such that the center of the beam spot is focused on the first light receiving portion $7a4$ of the first and second light receiving portions $7a4$ and $7a5$ of the first light receiving element $7a$. The reflected-back laser beam $11b'$ from the semi-transparent layer (not shown) formed between the semiconductor substrate 6 and the prism 10 on the first light receiving element $7a$ is converged on the upper face $10c$ of the prism 10 and then reflected thereon so that the converged laser beam is again diverged so as to become incident on the first and second light receiving portions $7b4$ and $7b5$ of the second light receiving element $7b$. Also in this case, the above-mentioned diverged laser beam is incident thereon in such a manner that the center of the beam spot is formed on the first light receiving portion $7b4$. Under the condition that the laser beam incident on the optical disc is just focused on the information pit of the optical disc, the diameters of beam spots become equal to each other on the first and second light receiving elements $7a$ and $7b$ as shown at the just focus $2b$ in FIG. 7. Thus, the electrical outputs A and B from the first and second differential amplifiers $3a$ and $3b$ become equal to each other so that the differential output between the outputs A and B, i.e., the output C from the third differential amplifier $3c$ becomes zero. However, the beam spot of the reflected-back laser beam is displaced to the sides of the first light receiving portions $7a4$ and $7b4$ of the first and second light receiving elements $7a$ and $7b$ so that the positive electrical output becomes large. Thus, the output curves A and B do not cross at the zero point as shown in FIG. 4 but they cross at the position displaced to the positive gain side from the zero point as shown in FIG. 8. The spot diameters formed at the positions ahead of and behind the just focus position are reversed on the first and second light receiving elements $7a4$ and $7a5$ and $7b4$ and $7b5$ of the first and second light receiving elements $7a$ and $7b$ as shown by the converged positions $2a$ and $2c$ in FIG. 7, thus resulting in curves A, B and C in FIG. 8. As will be clear from FIG. 8, the focusing error signal curve C does not bring about the zero-cross point except the just focus position D.

Figure 9:
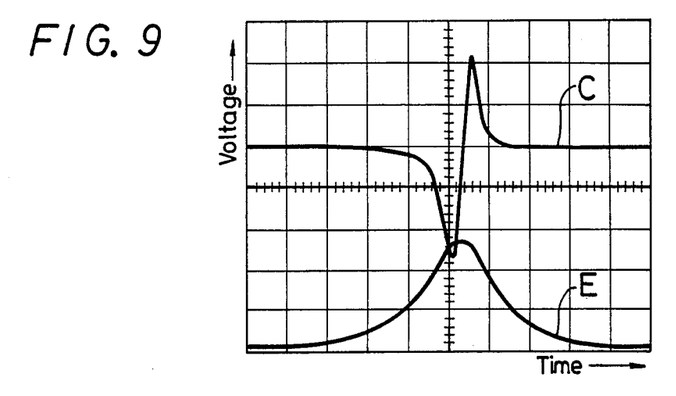
FIGS. 9 and 10 are respectively graphs of measured results of focusing error detecting characteristics of the present invention.
Figure 10:
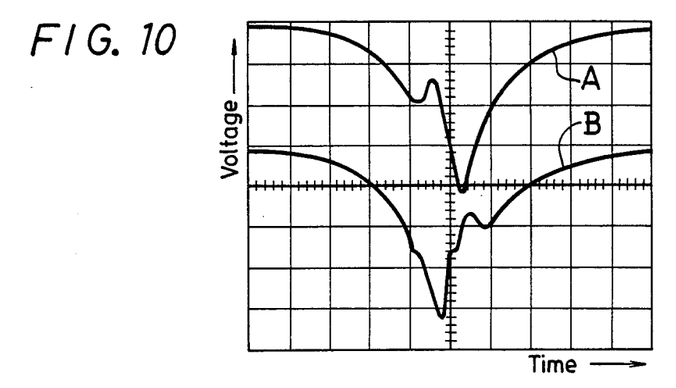

FIG. 9 illustrates measured curves of focusing error detecting characteristics, wherein the focusing error detecting signal curve C is presented in the unit of 5V and an RF reproduced signal curve E is presented in the unit of 0.5V. FIG. 10 illustrates measured curves of differential outputs from the first and second differential amplifiers 3a and 3b wherein the differential output curves A and B are both presented in the unit of 2V. As will be clear from FIG. 10, an S-shaped curve of excellent symmetry is obtained, which does not bring about the zero-cross point except the just focus point.

Figure 11:
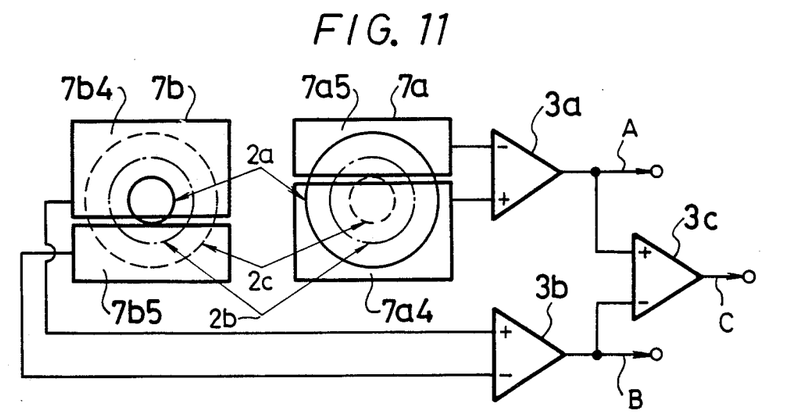

FIG. 11 illustrates another embodiment of the optical pickup device according to the present invention, in which the first and second light receiving elements 7a and 7b are constructed and located in a modified manner. In the embodiment shown in FIG. 11, unlike FIG. 7, the first and second light receiving portions 7a4 and 7a5 of the first light receiving element 7a are exchanged in location or the wider light receiving portion 7a4 is located under the narrow second light receiving portion 7a5 and hence the divided positions between the first and second light receiving portions 7a4, 7a5 and between the first and second light receiving portions 7b4, 7b5 of the first and second light receiving elements 7a and 7b are displaced from each other.

With the thus made arrangement, the fluctuations of light intensity distribution between the first and second light receiving portions 7a4, 7a5 and between the first and second light receiving portions 7b4, 7b5 of the first and second light receiving elements 7a, 7b can be averaged by the third differential amplifier, i.e., the calculating circuit 3c. While the first and second light receiving portions 7a4 and 7a5 of the first light receiving element 7a are exchanged in location as described above, it is needless to say that the above-mentioned effects can be similarly achieved by changing the size of the first and second light receiving portions 7a4 and 7a5 of the first light receiving element 7a.

According to the present invention, as set forth above, since it is sufficient that the reflected-back laser beam is introduced into the wider first light receiving portions 7a4 and 7b4 of the first and second light receiving elements 7a and 7b when the reflected-back laser beam irradiates the first and second light receiving elements 7a and 7b, the alignment accuracy of the optical system for introducing the reflected-back light into the first and second light receiving elements 7a and 7b can be alleviated and hence the optical pickup device of the present invention can be made free from the adjustment of the alignment accuracy of the optical system thereof. Furthermore, since the S-shaped curve of the focusing error detecting curve does not bring about the so-called zero-cross point except the just focus point, the optical pickup device of the present invention can execute the stable focusing servo operation.

The above description is presented by way of example on the preferred embodiments of the invention and it will be apparent that many modifications and variations thereof could be affected by one with ordinary skill in the art without departing from the spirit and scope of the novel concepts of the invention so that the scope of the invention should be determined only by the appended claims.

We claim as our invention:

1. In a focusing error detecting apparatus for detecting a focusing error signal by which an objective lens for always converging a laser beam emitted from a laser light source on a signal recording surface of an optical disc in accordance with the movement of said optical disc is moved in the direction parallel to an optical axis of said emitted laser beam incident on said optical disc, said focusing error detecting apparatus comprising:
   (a) a first photo-detector located in the optical path ahead of a focus point of a reflected-back light from said optical disc through said objective lens and having divided first and second light receiving portions of different sizes which are asymmetrical with respect to the center of beam spot of said reflected-back light incident on said first and second light receiving portions;
   (b) a second photo-detector located in the optical path behind the focus point of the reflected-back light from said optical disc through said objective lens and having divided first and second light receiving portions of different sizes which are asymmetrical with respect to the center of beam spot of said reflected-back light incident on said first and second light receiving portions of said second photo-detector; and
   (c) calculating means for calculating a difference between detected outputs from said first and second photo-detectors to produce a focusing error signal.

2. A focusing error detecting apparatus according to claim 1, in which said calculating means calculates a difference between a difference of the detected outputs from said first and second light receiving portions of said first photo-detector and a difference of the detected outputs from said first and second light receiving portions of said second photo-detector.

3. A focusing error detecting apparatus according to claim 1, in which said first and second photo-detectors have their light receiving portions divided in the direction substantially parallel to the direction in which said emitted laser beam from said laser light source scans said signal recording surface of said optical disc.

4. A focusing error detecting apparatus according to claim 3, in which said second photo-detector is divided in such a manner that its first light receiving portion becomes equal to that of said first photo-detector in area and that its second light receiving portion becomes equal to that of said first photo-detector in area.

5. A focusing error detecting apparatus according to claim 4, in which said first light receiving portion of said first photo-detector is selected larger in area than its second light receiving portion and said first light receiving portion of said second photo-detector is selected larger in area than its second light receiving portion.

6. A focusing error detecting apparatus according to claim 5, in which said first light receiving portion of said first photo-detector is located at one side with respect to the center of beam spot of said reflected-back light incident thereon in alignment with said first light receiving portion of said second photo-detector and said second light receiving portion of said first photo-detector is located at the other side with respect to the center of beam spot of said reflected-back light incident thereon in alignment with said second light receiving portion of said second photo-detector.

7. A focusing error detecting apparatus according to claim 5, in which said first light receiving portion of said first photo-detector is located at one side relative to the center of beam spot of said reflected-back light incident thereon in alignment with said second light receiving portion of said second photo-detector and said second light receiving portion of the former photo-detector is located at the other side relative to the center of beam spot of said reflected-back light incident thereon in alignment with said first light receiving portion of the latter photo-detector.

8. An optical head device comprising:
(a) a semiconductor laser chip mounted on a substrate;
(b) converging means for converging a laser beam emitted from said semiconductor laser chip on a certain point of an optical path of said emitted laser beam;
(c) a first photo-detector located in the optical path ahead of a focusing point of an incident laser beam through said converging means mounted on said substrate and having divided first and second light receiving portions which are different in size and asymmetrical with respect to the center of beam spot of said incident laser beam;
(d) a second photo-detector located in the optical path behind the focusing point of the incident laser beam through said converging means mounted on said substrate and having divided first and second light receiving portions which are different in size and asymmetrical with respect to the center of beam spot of said incident light;
(e) an optical element mounted on said first and second photo-detectors located on said substrate and of which the face opposing to said semiconductor laser chip is formed as an inclined face for reflecting said laser beam emitted from said semiconductor laser chip and has a semi-transparent layer through which said laser beam incident thereon through said converging means travels; and
(f) calculating means for calculating a difference between respective detected outputs from said first and second photo-detectors to produce a focusing error signal, whereby said focusing error signal from said calculating means is fed back to said converging means.

9. An optical head device according to claim 8, in which said calculating means calculates a difference of differences between the detected outputs from said first and second light receiving portions of said first photo-detector and between the detected outputs from said first and second light receiving portions of said second photo-detector.

10. An optical head device according to claim 8, in which said first and second light receiving portions of said first and second photo-detectors are divided in the direction parallel to the direction in which said laser beam incident thereon through said converging means travels.

11. An optical head device according to claim 10, in which said second photo-detector is divided in such a fashion that its first light receiving portion becomes equal to the first light receiving portion of said first photo-detector in area and that its second light receiving portion becomes equal to the second light receiving portion of said first photo-detector in area.

12. An optical head device according to claim 11, in which said first light receiving portion of said first photo-detector is larger in area than its second light receiving portion and that said first light receiving portion of said second photo-detector is larger in area than its second light receiving face.

13. An optical head device according to claim 12, in which said first light receiving portion of said first photo-detector is located at one side relative to the center of beam spot of said reflected-back light incident thereon in alignment with said first light receiving portion of said second photo-detector and said second light receiving portion relative to the former photo-detector is located at the other side of the center of beam spot of said reflected-back light incident thereon in alignment with said second light receiving portion of the latter photo-detector.

14. An optical head device according to claim 12, in which said first light receiving portion of said first photo-detector is located at one side relative to the center of beam spot of said reflected-back light incident thereon in alignment with said second light receiving portion of said second photo-detector and said second light receiving portion of the former photo-detector is located at the other side relative to the center of beam spot of said reflected-back light incident thereon in alignment with said first light receiving portion of the latter photo-detector.

* * * * *